Patented Aug. 21, 1951

2,564,859

UNITED STATES PATENT OFFICE 2,564,859

CERAMIC AND METHOD OF MAKING SAME

Edwin J. Rogers, Sidney, N. Y., assignor to Bendix Aviation Corporation, New York, N. Y., a corporation of Delaware No Drawing. Application September 9, 1949, Serial No. 114,931

8 Claims. (Cl. 106—63)

This invention relates to spark plug and other insulators, particularly to those that are made of ceramic materials, and to a method of making the new insulators.

Beryllium oxide is highly dielectric and heat resistant at high temperature and because of those properties it was proposed as early as 1929 to employ it as a constituent of spark plug insulators. However, difficulties have beset all attempts to use it, up to the present time, particularly because it has shown lack of strength alone or in combination with other ingredients, and because it has exhibited toxicity. In 1932 it was proposed to mix it with silica and alumina. In 1933 it was proposed to add up to 10% magnesium oxide and alumina to one of its forms. In 1940 it was proposed to employ it alone in a state of high purity in the manufacture of spark plug insulators. Later it was proposed to add up to 5% silica and 15% magnesia to it. In 1946 36 Journal of Research of the National Bureau of Standards 297 reported some unsatisfactory studies of BeO-Al$_2$O$_3$-CaO to determine vitrification range. However, its use still remained a problem which promised much but yielded only imperfect results. This was particularly apparent in shapes made by extrusion molding.

Beryllium oxide when used by itself in a ceramic body requires a maturing temperature of approximately 1925° C. or 3497° F. to mature. This high temperature is above the practical range of any commercial kiln.

It is, consequently, an object of this invention to devise a method of manufacture that will make beryllium oxide useful at ordinary kiln temperatures.

It is an object of this invention to make a spark plug insulator of improved heat resistance, thermal conductivity, and strength employing beryllium oxide as the basic constituent, and to make such insulators that will withstand the conditions existing in use on engines, with a minimum of dielectric losses.

The objects of the invention are accomplished generally speaking by a dielectric composition preferably containing the form of beryllium oxide known as BeO, containing 85 to 95% of it, and containing a balance, except for traces of impurities, to make 100% of tri-calcium-penta-aluminate of the formula 3CaO·5Al$_2$O$_3$. This composition produces a superior ceramic useful in many industries where ceramics of high heat resistance and high thermal conductivity are necessary, and particularly, in the automotive spark plug field where heat resistance, strength, and dielectric properties are essential.

It was found that by the addition of tri-calcium-penta-aluminate to the BeO body the maturing temperature could be reduced to the range of present day high temperature kilns, which attain 1650° C. or 3000° F.

The ceramic pieces may be formed in any way which is satisfactory for the production of ceramic shapes for a particular art, by hand or by machine, but in the manufacture of spark plug insulators the mixture is preferably molded by injection molding under pressure. A mold having the required shape of the ceramic material may be provided and the mixture forced therein at an elevated temperature and pressure with or without the presence of bonding and lubricating agents to be removed later from the products. After removal from the mold the shape may be machined for instance to remove mold marks or to impart particular conformation, and fired. In molding, various lubricants or bonding agents may be employed, but I prefer to use the principles set forth in a copending application of Rogers and Mooney, Serial No. 15,866, filed March 19, 1948, in which there are disclosed novel lubricants and a novel process of removing them from the article. Shaping may be carried out in the cold and without pressure for some uses.

The following examples illustrate the invention. The beryllium oxide used was of ceramic grade ground to 325 mesh.

Example 1

95% by weight finely divided BeO was intimately mixed with 5% 3CaO·5Al$_2$O$_3$, injection molded to shape under pressure without lubricants, machined, and fired at a sintering temperature of 1650° C. This produced a ceramic of great strength.

Example 2

90% BeO and 10% 3CaO·5Al$_2$O$_3$ were treated as in Example 1 and tested in the same way. The strength was not as good as Example 1 but better than the prior art.

Example 3

85% BeO and 15% 3CaO·5Al$_2$O$_3$ were treated as in Example 1, tested and compared, being found weaker than Example 2 but still superior to the prior art.

Example 4

For comparison, straight BeO was similarly molded, machined and fired but the product was inferior in strength to all the foregoing.

An advantage of the invention as compared to other ceramics such as aluminum oxide are, in part, these:

The beryllium oxide bodies are lighter, having a bulk density circa 2.8 as compared to circa 3.7 for aluminum oxide. The thermal conductivity of the beryllium oxide bodies is 3 to 4 times greater than aluminum oxide. The $Te$ value for the beryllium oxide bodies is better than for aluminum oxide ($Al_2O_3$) bodies by about 100° C., being on the order of 1100° C. to 1000° C.

These new bodies mature at the temperature attainable in commercial kilns, viz., about 1650° C., compared to 1925° C. for pure beryllium oxide.

This invention does not relate to the control of toxicity during manufacturing, which is a different problem.

As many apparently widely different embodiments of the present invention may be made without departing from the spirit and scope thereof, it is to be understood that the invention is not limited to the specific embodiments.

What is claimed is:

1. A ceramic, spark plug insulator composed of 85 to 95% beryllium oxide and a balance, except for traces of impurities, of tri-calcium-penta-aluminate.

2. A ceramic, spark plug insulator composed of 95% BeO and 5% $3CaO \cdot 5Al_2O_3$.

3. A cermic, spark plug insulator composed of 90% BeO and 10% $3CaO \cdot 5Al_2O_3$.

4. A ceramic, spark plug insulator having the composition 85% BeO and 15% $3CaO \cdot 5Al_2O_3$.

5. The method of making ceramic insulators for spark plugs that includes the steps of intimately mixing 85 to 95% of beryllium oxide with a balance to make 100%, save for traces of impurities, of tri-calcium-penta-aluminate, shaping and machining the product at a temperature below firing temperature, and firing the shape.

6. The method of making ceramic insulators for spark plugs that includes the steps of intimately mixing 85 to 95% of beryllium oxide with a balance to make 100%, save for traces of impurities, of tri-calcium-penta-aluminate, shaping the product at a temperature below firing, and firing the shape.

7. The method of making ceramic shapes that includes the steps of intimately mixing 85 to 95% of beryllium oxide with a balance to make 100%, save for traces of impurities, of tri-calcium-penta-aluminate, shaping the product and firing the shape.

8. A ceramic article composed of 85 to 95% BeO and 15 to 5% $3CaO \cdot 5Al_2O_3$.

EDWIN J. ROGERS.

REFERENCES CITED

The following references are of record in the file of this patent:

UNITED STATES PATENTS

| Number | Name | Date |
| --- | --- | --- |
| 2,423,958 | Austin et al. | July 15, 1947 |
| 2,491,412 | Lecuir | Dec. 13, 1949 |